(12) United States Patent
Thubert et al.

(10) Patent No.: US 11,941,146 B2
(45) Date of Patent: Mar. 26, 2024

(54) DATA PRIVACY VIA CROSS JURISDICTION CONTAINER EXECUTION

(71) Applicant: Cisco Technology, Inc., San Jose, CA (US)

(72) Inventors: Pascal Thubert, Roquefort-les-Pins (FR); Patrick Wetterwald, Mouans Sartoux (FR); Eric Levy- Abegnoli, Valbonne (FR); Jonas Zaddach, Antibes (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 392 days.

(21) Appl. No.: 17/462,501

(22) Filed: Aug. 31, 2021

(65) Prior Publication Data

US 2023/0068788 A1 Mar. 2, 2023

(51) Int. Cl.
*G06F 21/62* (2013.01)
*G06F 9/455* (2018.01)
*H04L 9/32* (2006.01)

(52) U.S. Cl.
CPC ...... *G06F 21/6245* (2013.01); *G06F 9/45558* (2013.01); *H04L 9/3247* (2013.01); *H04L 9/3268* (2013.01); *G06F 2009/4557* (2013.01); *G06F 2009/45595* (2013.01); *G06F 2221/2111* (2013.01)

(58) Field of Classification Search
CPC ............. G06F 21/6245; G06F 9/45558; G06F 9/3247; G06F 9/3268
See application file for complete search history.

(56) References Cited

U.S. PATENT DOCUMENTS

| 2007/0162359 | A1* | 7/2007 | Gokhale | ................ G06Q 10/08 705/28 |
| 2010/0257351 | A1* | 10/2010 | O'Connor | ............. G06F 21/606 713/150 |
| 2011/0225120 | A1* | 9/2011 | Cooper | ................ G06F 16/273 707/610 |

(Continued)

OTHER PUBLICATIONS

Servicenow, "Complying with the General Data Protection Regulation (GDPR)," White Paper, Sep. 17, 2018, 15 pages.

*Primary Examiner* — Vance M Little
(74) *Attorney, Agent, or Firm* — Edell, Shapiro & Finnan, LLC

(57) ABSTRACT

A container includes a user program and data generated by the user program within a regulatory jurisdiction. Before the container leaves the regulatory jurisdiction, the data is validated by the jurisdiction to ensure the data complies with privacy laws of the jurisdiction. Upon ingress to a second regulatory jurisdiction, the data is signed locally to provide for confirmation that the data can leave the second regulatory jurisdiction, since it was not generated within the second jurisdiction. By allowing the user program to move from the first regulatory jurisdiction to a second regulatory jurisdiction, the disclosed embodiments overcome limitations in current solutions that restrict access to local data based on what a public application programming interface (API) can provide. By operating within the regulatory jurisdiction, albeit subject to access controls imposed by that jurisdiction, flexibility in the processing of sensitive data is improved.

20 Claims, 7 Drawing Sheets

(56) References Cited

U.S. PATENT DOCUMENTS

| | | | |
|---|---|---|---|
| 2014/0165137 A1* | 6/2014 | Balinsky | G06F 21/6245 |
| | | | 726/1 |
| 2014/0173687 A1* | 6/2014 | Dimitrakos | G16H 10/60 |
| | | | 726/1 |
| 2016/0156671 A1 | 6/2016 | Cabrera et al. | |
| 2016/0306989 A1 | 10/2016 | Embleton | |
| 2018/0025168 A1 | 1/2018 | Roth et al. | |
| 2018/0314981 A1* | 11/2018 | Chen | G06F 9/5072 |
| 2020/0082087 A1 | 3/2020 | Simmons et al. | |
| 2020/0127981 A1* | 4/2020 | Yang | H04L 63/068 |
| 2020/0241975 A1* | 7/2020 | Basham | G06F 11/1415 |
| 2020/0342119 A1 | 10/2020 | Yared et al. | |
| 2022/0100892 A1* | 3/2022 | Safi | G06F 9/45558 |

* cited by examiner

DATA PRIVACY VIA CROSS JURISDICTION CONTAINER EXECUTION

TECHNICAL FIELD

The present disclosure relates to data privacy.

BACKGROUND

Today's internet is becoming more and more fragmented by regulatory requirements. Regulatory frameworks such as the General Data Protection Regulation (GDPR) and the California Consumer Privacy Act (CCPA) require data owners to process or share data subject to strict legal limits, rendering processing of multi-site, multi-owner data sets challenging. These regulatory frameworks require data to be stripped of personal identifiers before sharing it with others, for example, by anonymizing or distributing data in an aggregated form.

DESCRIPTION OF EXAMPLE EMBODIMENTS

Overview

Figure 1:
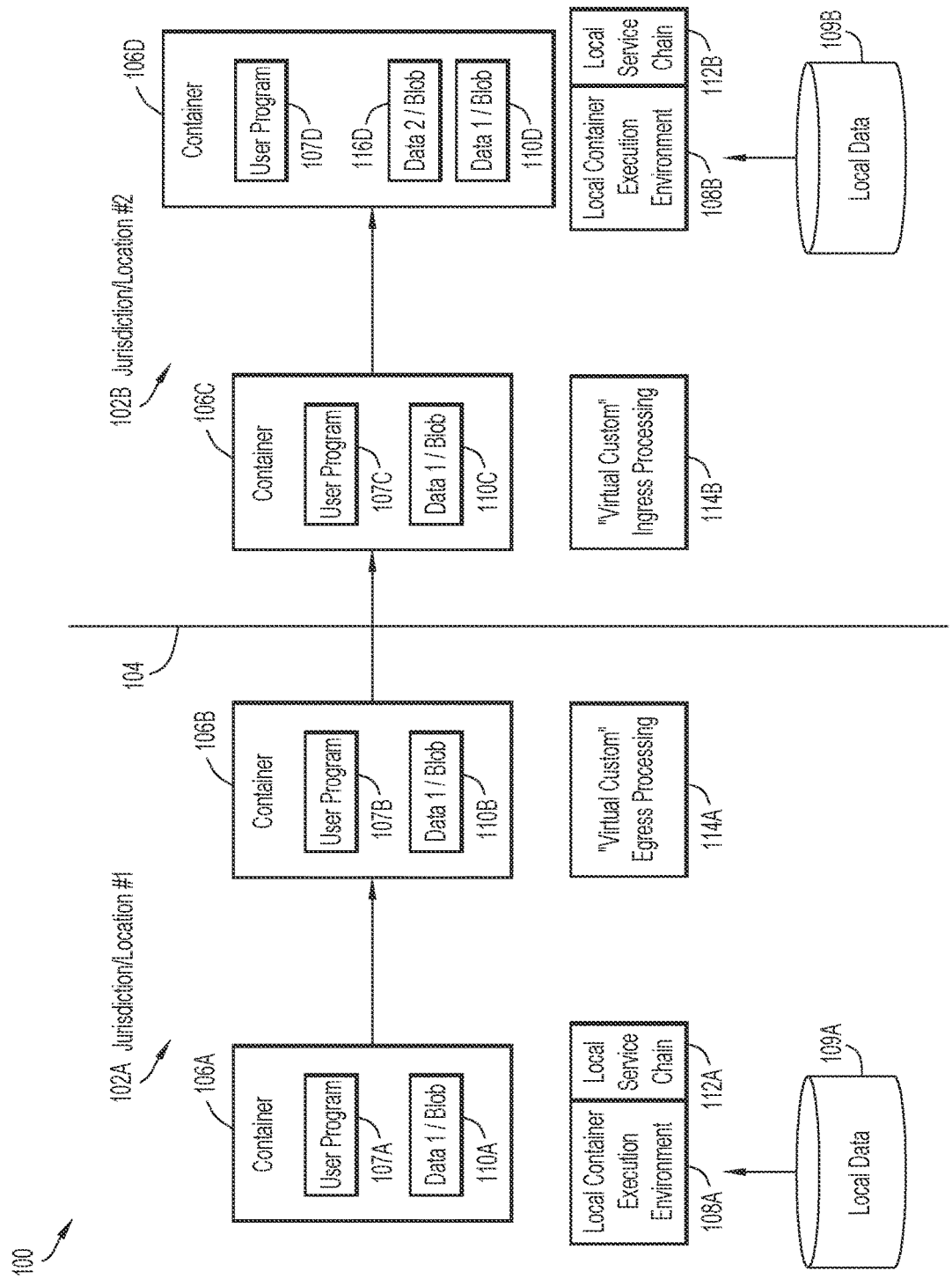
FIG. 1 is an overview diagram illustrating a cross-jurisdictional container processing environment according to an example embodiment.

Embodiments are presented herein that comply with jurisdiction specific data privacy regulations, while still providing flexibility to implement algorithms in a manner that is less constrained than is possible with current application programming interface (API) based privacy solutions. In one form, a method includes loading, within a first regulatory jurisdiction, a container into a container execution environment, the container including a user program. The method further includes executing the user program within the container execution environment and obtaining from the user program, intermediate data. The method further involves determining the intermediate data meets a data export policy of the first regulatory jurisdiction, and generating, based on the determining, validated data. The method further includes generating, based on a key that is private to the first regulatory jurisdiction, and further based on the validated data, a first digital signature. The method involves storing the validated data and the first digital signature in the container, receiving a request to export the container outside the first regulatory jurisdiction. In response to the request, the method includes confirming, based on the key, the digital signature of the validated data included in the container, and exporting, based on the confirming, the container.

Example Embodiments

Existing sovereign protection is typically enforced through APIs having controlled outputs. Such API based solutions only provide the services that were foreseen by the API. Ideally, any user log (or micro service) could be allowed over a database (or a data stream) as long as it does not exfiltrate data that it is using for the computation that also does not comply with jurisdictional export restrictions on that data.

Embodiments presented herein provide a container execution environment that allows for local container execution within a regulatory jurisdiction, while preserving data privacy requirements of the local jurisdiction.

Some of the disclosed embodiments provide a (e.g., cloud-native) method to protect the sovereignty and secrecy of data used by an arbitrary user program, and provide a manifest of "right to export" that can be validated by a "virtual custom." The information that is returned (e.g., via an API, as a web page, in an object) is inspected to match authorized content before it is encrypted. The encrypted data is signed to attest that the verification took place, such as by a service chain in a data processing unit (DPU). In embodiments that utilize Docker™ as a container execution environment, a virtual cargo transports the container, loaded with a signed product of a regulatory-compliant execution (e.g. GDPR), so that the container can execute in an additional jurisdiction on additional local data. The cargo is an envelope with extra metadata that includes a manifest of the data that is exported, and the digital signature. A separate virtual custom on the way out (e.g., in the server return API, or in a firewall), can validate the signature against the exported data to allow the data through. This contrasts with prior solutions where only the result of preinstalled APIs is exported, in which case the only program that can run is provided by the APIs.

Given that a jurisdiction controls information available for export outside of the jurisdiction, it is not possible, in some circumstances, to transfer data to where a program is located to allow that data to be processed by the program. Thus, the disclosed embodiments generally reverse this model by moving the executable programmatic object (code and data) from one location to a next location. The movable executable program object is in the form of a binary that is loaded in a container. The container is then moved to a location where local data is available, and the executable program then accesses the local data.

Thus, these embodiments separate a location of an executable environment of the program (e.g., a cloud environment where the sovereign data can be read and where a "right to export" manifest is generated) and a method that returns the result of the user program to the user (exported via a "virtual custom").

Some definitions of terms used in this description are provided below.

User program: an arbitrary piece of software that, in at least some embodiments, is used for a privileged access to sovereign data when executing within a privileged environment (e.g., local to GDPR controlled data is stored). This contrasts with simply an API, which relies on logic provided by a server within a particular jurisdiction. Instead, the user program executes any logic and is not limited to the API the server provides. The user program can be a server-side JavaScript, a software agent or more specifically a software walker, or an application in a phone that connects to the local network where the sovereign data is accessible.

A right to export: metadata associated to an arbitrary blob that is consulted to validate that the blob does not contain sovereign data.

Virtual custom: a network function that validates the "right to export" of an arbitrary binary. In at least some embodiments, the virtual custom is implemented as part of logic that returns data in an API, such as a an event stream (e.g., Kafka®) API or any Google® Remote Procedure Call (gRPC) call, builds the resulting body of an hyper-text markup language (HTML) request, transports a mobile agent, or allows a walker to walk out. It can be located in a firewall that validates the data being allowed out, in an API, or as a micro service.

Some embodiments include a user program that (in at least one embodiment) is formed as an enhanced container orchestration system, e.g., Kubernetes (K8S), container. Some embodiments enhance a deployment manifest used by kubectl (https://devspace.cloud/docs/cli/deployment/kubernetes-manifests/configuration/overview-specification) with information about the sovereign data that it will query. Some embodiments also include a container execution environment. Some embodiments augment an existing container execution environment (e.g. "Docker") with: 1) a cargo engine that translates this container to a next location in a regulatory-compliant execution location chain based on a novel displacement manifest, and 2) a policy engine that validates that this container is entitled to access data detailed in a data access manifest at this location. The disclosed embodiments also include a jurisdiction specific service chain described below. The jurisdiction specific service chain, in at least some embodiments, performs one or more of validation, encryption via a public key provided by the user program, and signing via a "virtual custom" (e.g. private to the jurisdiction) private key. Once the user program has executed, it generates a blob of information that is the only data output of the user program; an object of the service chain is to validate that the resulting data can be exported.

The service chain is composed of services (e.g. cloud native services in some embodiments) that are chained in a namespace of a container execution environment. The service chain is based on a policy that applies to a container, depending on the container's origin and accreditation. The service chain is configured for execution, in some embodiments, as a hardware-assisted Software-Defined Data Center (SDDC) service in a Data Processing Unit (DPU) and chained with the transmission by the containers that implement this. Services of the service chain include one or more of the below:
1. A product validation service accessible via a namespace of a container execution environment. The product validation service validates that intermediate data generated by execution of the user program is not infringing the (say, export) local data policies.
2. An encryption service that protects the data generated by the user program with a key provided by the user program itself. By including the encryption service as part of the jurisdiction specific service chain, a need for the user program to encrypt data is eliminated. This therefore prevents avoidance of examination of a data generated from the user program. In some embodiments, the container includes metadata, such as the encryption key used by the encryption service to encrypt data generated by the user program. Because the user program provides the encryption keys, the user program is then able to decrypt the data as necessary to support subsequent processing.
3. A digital signature service. The digital signature service signs the encrypted blob produced by the encryption service. A key used by the digital signature service is one that allows a virtual custom or egress service to verify. The egress service verifies that any data leaving the jurisdiction has been signed by the digital signature service and is therefore ok to allow outside the jurisdiction. In other words, the digital signature attests that the data generated by the user program has been through the service chain and thus is acceptable for export.

At least some embodiments provide for a virtual cargo function in a container environment. The virtual cargo function translates (e.g. moves) a container from one location or jurisdiction to a next location or jurisdiction. Each jurisdiction provides access to different local data, and thus, in accordance with at least some of the disclosed embodiments, the container moves from location to location, accessing data used to perform its function. Thus, from one perspective, these embodiments provide a hybrid of a container and mobile agent.

As discussed above, some embodiments deploy a "virtual custom" on a path of the container of the user program as it leaves a sovereign area. The virtual custom validates that what goes out only includes the user program going in (that it signed previously as such) and one or more blobs signed by the service chain above. In the example of the mobile agent, the virtual custom can be a firewall function that leverages micro-services to ensure that all the components that make the mobile agent were signed.

FIG. 1 is an overview diagram illustrating a cross-jurisdictional container processing environment according to an example embodiment. The environment 100 includes a first location 102A and a second location 102B separated by a boundary 104. The first location 102A and the second location 102B represent, in some embodiments, different jurisdictions or legal environments, such as different legal environments provided by different sovereign entities (e.g., nations, provinces, etc.). In some embodiments, the first location 102A and the second location 102B represent different computational environments that include different data. For example, a first computational environment, provided within a first security domain, has access to a first set of local data, while the second location 102B is a second computational environment, provided within a second security domain, having access to a second set of local data. In some embodiments, the first security domain is provided by a first entity, such as a first corporation or other first organization (e.g., non-profit, etc.), and the second security domain is provided by a second entity, such as a second corporation or second organization.

FIG. 1 further illustrates a container as it moves through various processing stages and crosses the boundary 104 from the first location 102A to the second location 102B. A single container is represented as four distinct containers 106A-D as the container moves through each of four different processing stages discussed below. The single container includes a user program, and data, each represented with four different reference numbers, the user program as 107A-D, and the data as 110A-D, as the container moves through each of the four different processing stages.

FIG. 1 shows the container, first represented as container 106A. A user program 107A is executing within a container execution environment 108A that is local to the first location 102A. While executing within the container execution environment 108A, the user program 107A accesses local data 109A. A result of the processing of the local data 109A by the user program 107A is that the data 110A is generated. The data 110A is validated by a local service chain 112A that is specific to the first location 102A. The local service chain 112A is specific to the first location 102A in that the local service chain 112A is configured to enforce a regulatory regime or data export rules defined by the first location 102A. Upon one or more of validation, encryption, and signing of the data 110A by the local service chain 112A, the container 106A is processed by a virtual custom 114A that is configured to perform egress processing on the container, represented as container 106B that includes, when being processed by the virtual custom 114A, user program 107B, and data 110B.

The virtual custom 114A performs egress processing by verifying that the data 110B (previously the data 110A) has been validated and signed by the local service chain 112A. The container then crosses the boundary 104 and is processed by a second virtual custom 114B within the second location 102B. Some embodiments implement transportation of the container 106B to the second location 102B in a manner compliant with one or more techniques described in Request for Comments (RFC) 8152, e.g. concise binary object representation (CBOR) object signing and encryption (COSE). COSE is used, in some embodiments, as a method to transport blobs and/or the user program of the container 106B from the first location 102A to the second location 102B. In some embodiments, COSE defines the container 106B as constrained application protocol (CoAP) content. Alternatively, the container 106B is transported as a message. COSE provides, for example, an ability to represent each blob of a container as an object, and each blob/object is then individually encrypted and signed. In some embodiments, the container 106B is signed as a whole. These embodiments utilize a variety of digital signature methods known in the art, which are independent of COSE. Thus, these embodiments run COSE in CoAP (using a program's encryption key), and then transport the signed container over the datagram transport layer security (DTLS).

Thus, the container, now represented as container 106C, is imported into the second location 102B when it crosses the boundary 104. When processed by the second virtual custom 114B, the container 106C includes user program 107C and data 110C. The data 110C represents imported data within the second location 102B, since the data 110C was generated outside the second location 102B. Because the data 110C is imported data and not data generated within the second location 102B, the second virtual custom 114B signs the data 110C (equivalent to the data 110A but encrypted, and digitally signed by the local service chain 112A) within the container 106C. By signing the data 110C when it enters the second location 102B, the second virtual custom 114B indicates that the data 110C originated from outside the second location 102B, and thus, is able to leave the second location 102B as needed. The container, now represented as container 106D, and including user program 107D, and data 110D, is executed within the container execution environment 108B, where it is able to access local data 109B. The container 106D then generates data 116D, which is validated by a local service chain 112B that is local to the second location 102B. The validated data is then potentially exported to a third location (not shown) via a third virtual custom (not shown) analogous to the virtual custom 114A.

Figure 2:
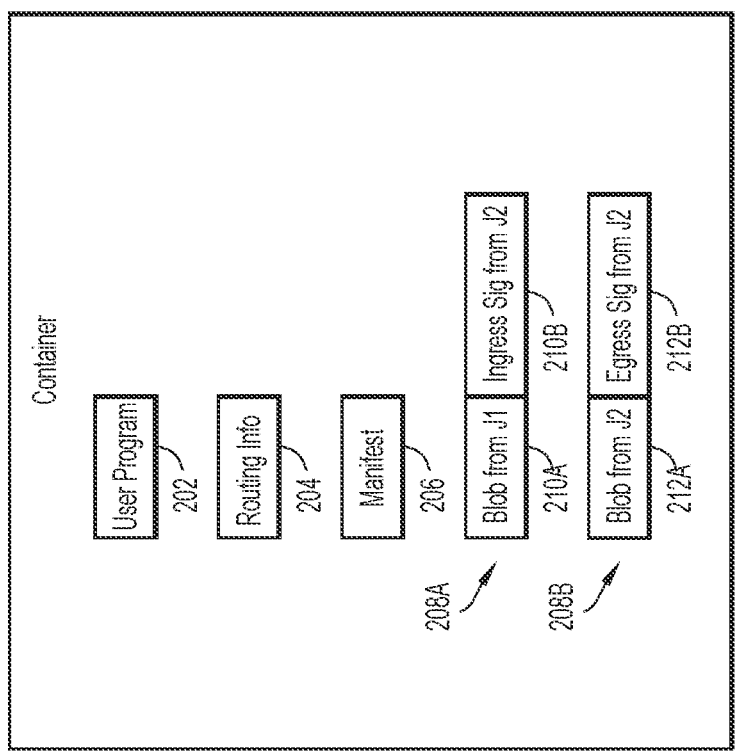
FIG. 2 illustrates data included in a container in accordance with an example embodiment.

FIG. 2 illustrates data included in a container in accordance with an example embodiment. The container 200 includes a user program 202, routing information 204, a manifest 206, a first blob 208A, and a second blob 208B.

The user program 202 includes instructions that configure a container execution environment (e.g. the container execution environment 108A and/or the container execution environment 108B) to perform one or more of the functions attributed to the user program throughout this disclosure. For example, the user program 202 accesses data local to a location (e.g. local data 109A from the first location 102A and/or local data 109B from the second location 102B). The user program 202 also includes instructions to access a service chain local to the execution environment (e.g. local service chain 112A when operating within the container execution environment 108A and/or the local service chain 112B when operating within the container execution environment 108B).

The routing information 204 indicates a list of one or more data items the container 200 needs to access in order to perform its designated function(s). In some embodiments, the routing information 204 also indicates an order in which the data items are to be accessed. As discussed further below, the routing information 204 is processed by a container router to place the container 200 within a container execution environment that can provide access to one or more data items listed in the routing information 204.

The manifest 206 provides a list of authorizations of the container to access data. For example, in some embodiments, the manifest 206 identifies one or more digital certificates granted from one or more locations or jurisdictions that indicate which data within the jurisdiction is accessible by the container 200.

The first blob 208A represents data generated by the user program 202 when the user program 202 is operated in a first jurisdiction (e.g., "J1"). The first blob 208A includes a data portion 210A, an ingress signature 210B added by a second jurisdiction. The ingress signature 210B is added to the first blob 208A when the data portion 210A enters the second jurisdiction.

The second blob 208B represents data generated by the user program 202 when the user program 202 operated in the second jurisdiction. The second blob 208B includes a data portion 212A, an egress signature 212B from the second jurisdiction. The egress signature 212B is added to the second blob 208B when the data portion 212A was validated and then digital signed by a service chain local to the second jurisdiction. The ingress signature 210B and the egress signature 212B are removed, at least in some embodiments, when the container 200 is exported outside of the second jurisdiction.

Figure 3:
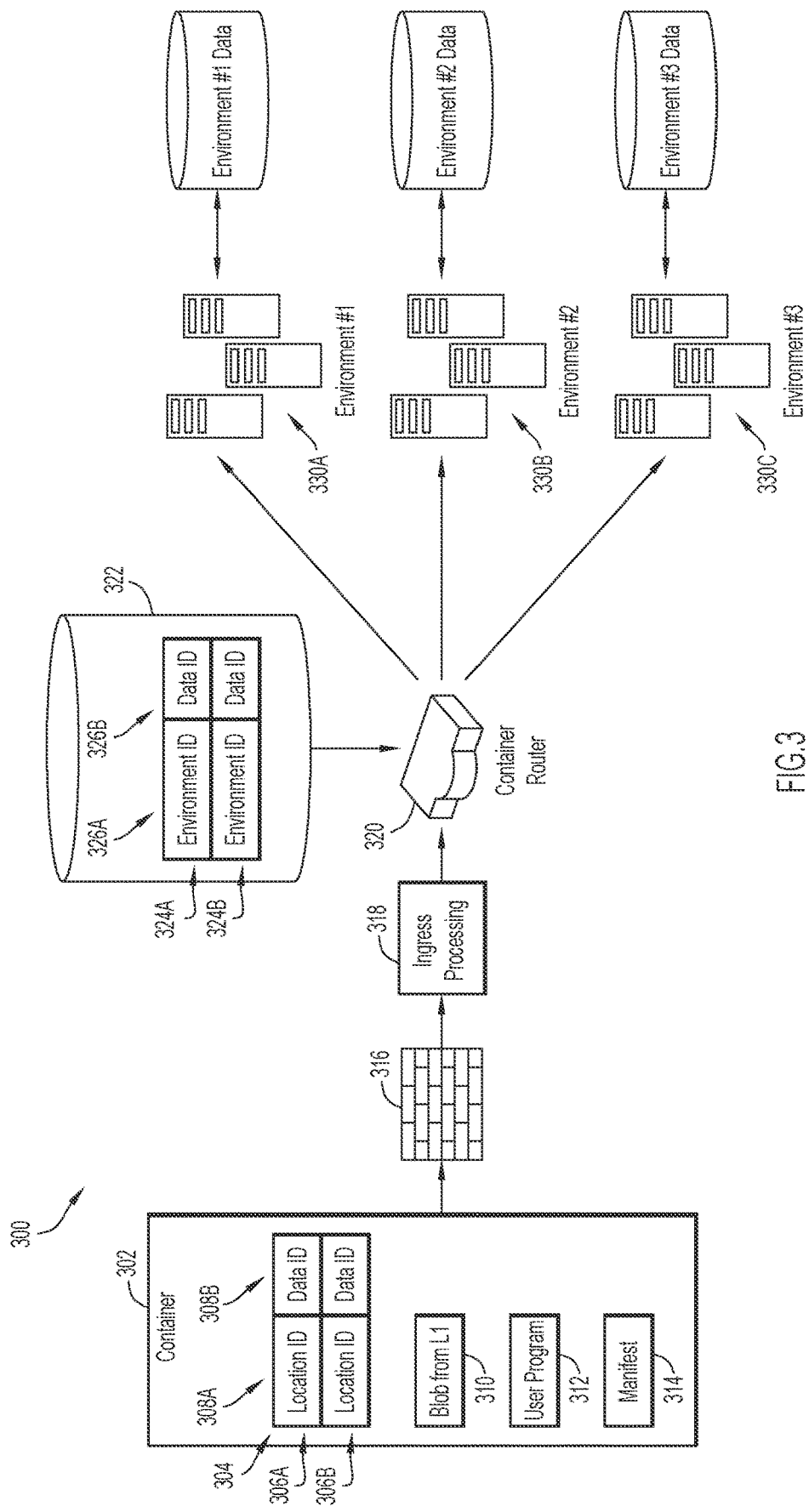
FIG. 3 is an overview diagram illustrating container routing in accordance with an example embodiment

FIG. 3 is an overview diagram 300 illustrating container routing in accordance with an example embodiment. FIG. 3 shows a container 302. The container 302 includes container routing information 304 (analogous to the routing information 204 discussed above with respect to FIG. 2), a blob 310 obtained from a first location "L1", (analogous to the first blob 208A or the second blob 208B), a user program 312 (analogous to the user program 202), and a manifest 314 (analogous to the manifest 206). The container routing information 304 includes two entries, a first entry 306A and a second entry 306B. Each entry includes a location identifier 308A and a data identifier 308B. Thus, the container routing information 304 indicates what data is needed by the container 302 (e.g. via the data identifier 308B) and where that data is located (e.g. via the location identifier 308A), such that the container 302 can be moved to a location from which the data can be accessed. In some embodiments, the location identifiers (e.g., location identifier 308A) are represented as uniform resource identifiers (URIs). In some embodiments, the URIs include a fully qualified domain name (FQDN) of a cloud location where the container 302 needs to run to access the data identified by the data identifier (e.g. data identifier 308B).

FIG. 3 illustrates the container 302 passing through a firewall 316 of a second location "L2" (e.g. different from the first location L1). The container 302 is processed by a virtual custom implementing ingress processing 318, which signs the blob 310 to indicate the blob 310 originated outside the location L2. The container 302 is then processed by a container router 320, which reads the container routing information 304 to determine where to route the container 302.

The container router 320 consults a container execution environment table 322. The container execution environment table 322 is shown including two entries, a first entry 324A and a second entry 324B. The container router 320 relies on the container execution environment table 322 to determine which environment (identified via environment identifier field 326A) provides access to which data (identified by data identifier field 326B). Upon determining, from the container execution environment table 322, which environment has access to data indicated in the container routing information 304, the container router 320 selects one of a plurality of environments, illustrated in FIG. 3 as a first environment 330A, a second environment 330B, or a third environment 330C. The container router 320 then routes the container 302 to the selected environment. The container 302 is then loaded into a container execution environment hosted by the selected environment, and the user program included in the container is executed.

Once the container 302 has accessed the data available within a particular location and performed any processing necessary within a particular environment, the container 302, in some embodiments, notifying the container router 320 that the particular step or data access of the container routing information 304 is completed. The container router 320 then selects an additional entry of the container routing information 304, if applicable, and routes the container 302 to an environment where the data specified in the additional entry is accessible.

Figure 4:
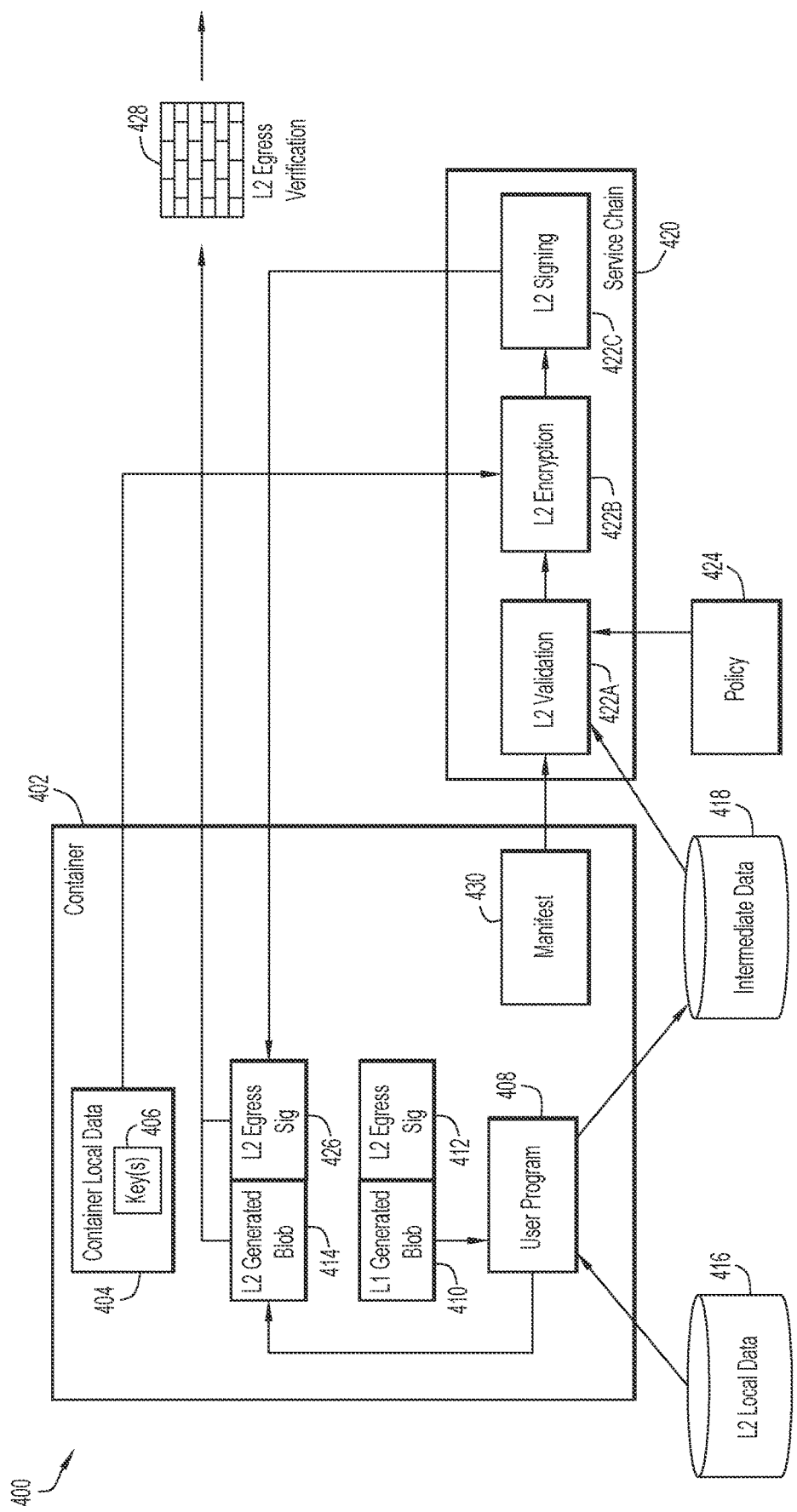
FIG. 4 is a data flow diagram illustrating data flow between a container and a service chain according to an example embodiment.

FIG. 4 is a data flow diagram illustrating data flow between a container and a service chain according to an example embodiment. The data flow 400 shows a container 402. The container 402 includes container local data 404. The container local data 404 stores a variety of information depending on embodiment. The container local data 404 of FIG. 4 is illustrated to be storing key information 406, which includes, in some embodiments, one or more encryption keys as discussed below. The container 402 also includes a user program 408, analogous to the user program 202 of FIG. 2 or user program 312 of FIG. 3. The container 402 is illustrated to include a manifest 430, analogous to the manifest 206 discussed above with respect to FIG. 2.

The container 402 is illustrated to include a first blob 410 that was generated within a first location or first jurisdiction (analogous to the first location 102A of FIG. 1). The first blob 410 previously included an egress signature generated by the first location or first jurisdiction prior to export from the first location or jurisdiction. An egress component within the first location or first jurisdiction removed the egress signature from the first blob 410 upon verifying that the first blob 410 had proper validation and a valid digital signature for export. Such a validation would have been performed on the first blob 410 when the first blob 410 was being prepared to leave the first location by a component analogous to the virtual custom 114A of FIG. 1. As discussed above, the virtual custom 114A is configured to perform egress processing.

The first blob 410 is shown to include an L2 ingress signature 412 that was generated within a second location (analogous to the second location 102B) when the first blob 410 entered the second location (e.g. by a component analogous to the second virtual custom 114B of FIG. 1 that is configured to perform ingress processing). The container 402 also includes a second blob 414. The second blob 414 represents data generated within a second location (e.g. a location in which the container 502 is shown to reside in FIG. 4). The user program, in some embodiments, reads data from the first blob 410 and from local data 416 located within the second location. The user program 408 is able to read data from the first blob 410, which is encrypted, based on key information 406. The user program 408 then generates intermediate data 418. The intermediate data 418 is read by a service chain 420. The service chain 420 includes at least three components in the illustrated embodiment, including a validation component 422A, an encryption component 422B, and a digital signing component 422C. Each of the validation component 422A, encryption component 422B, and the digital signing component 422C implement location or jurisdiction specific logic and/or data flow to enforce data privacy rules of the second location. To validate that the intermediate data 418 complies with regulatory requirements of the second location, the validation component 422A relies on policy information 424. The policy information 424 indicates, in some embodiments a data export policy of a location or particular regulatory jurisdiction. Thus, the data export policy defines, in some embodiments, limitations on what data can be exported from the second location. For example, the data export policy defines, in some embodiments, limitations on the amounts or types of data that can be exported. The validation component 422A applies one or more policies specified in the policy information 424 to the intermediate data 418. In some embodiments, the validation component 422A also consults information included in a manifest 430 that is included in the container 402. In some embodiments, the manifest describes data that the container will attempt to export from the second location. Data indicated by the manifest 430 is verified for policy compliance by the validation component 422A by ensuring the manifest 430 complies with the policy information 424. The validation component 422A also ensures that the intermediate data 418 is consistent with the indications in the manifest. The policy information 424 indicates, in some embodiments, one or more of a proscription of types of data that are exportable from the second location. In some embodiments, the types of data are specified via elementary types, such as numbers, strings, IP addresses, email addresses, telephone numbers, or other simple typed data, as well as aggregated types such as dictionaries or lists. The policy information 424 and/or manifest 430 indicates, in some embodiments, restrictions on simple data types via pattern matching rules such as (sub)string matches, numeric operators, or regular expressions. In some embodiments, the policy information 424 and/or manifest 430 indicates a limit on a size of data having an aggregated type. Other restrictions specified by the policy information 424 and/or manifest 430, in some embodiments, include limitations on entropy of data, or restrictions on a combined size of aggregated data or containers. Some embodiments of the policy information 424 and/or manifest 430 indicate limitations on computation of the user program, such as a limit on a number of instructions executed, or data accessed by the user program (e.g. a limit on a number of rows in a table that are accessible by the user program). Some embodiments of the policy information 424 and/or manifest 430 specify query limitations, such as restricting an ability to query raw data from certain fields of the local data 416, such as a password field. In some embodiments, data derived from the password field, or other specified fields, are prohibited from being included in the intermediate data 418.

Assuming the intermediate data 418 complies with the policies, the validated data is encrypted by the encryption component 422B. The encryption is performed using keys provided by the container 402. The service chain 420 includes encryption capabilities so that the user program 408 does not need to provide its own encryption services. This works to ensure the user program 408 does not encrypt data which could then not be properly examined and validated by the service chain 420. Thus, the illustrated embodiment relies on the service chain 420 to perform any necessary encryption.

Once the intermediate data 418 has been encrypted by the encryption component 422B, the encrypted data is passed to the digital signing component 422C, which digitally signs the encrypted data using a signing key private to the second location. Thus, only the second location is able to validate the digital signature generated by the digital signing component 422C. The signed data is then placed in the second blob 414. The signature generated by the digital signing component 422C is represented as an egress signature 426.

When the container 402 leaves the second location or jurisdiction, an egress verification is performed by an egress verification component 428. The egress verification component 428 verifies the egress signature 426 is correct for the second location. The egress verification component 428 also verifies that the first blob 410 has a signature appropriate for the second location. In this case, the proper signature is represented by the L2 ingress signature 412. Since the data included in the first blob 410 was generated outside the second location, the egress verification performed by the second location allows the first blob 410 to leave the second location. After verifying the container 402 has proper digital signatures to be exported from the second location, some embodiments of the egress verification component 428 remove one or more of the L2 ingress signature 412 and/or the L2 egress signature 426. These signatures generally are unable to be decoded or validated when the container 402 is outside the second location, and thus these signatures are no longer necessary once the container 402 is exported. If the container 402 were to be re-imported into the second location, new ingress signatures would be added, in some embodiments, to each blob existing in the container 402 at the time of importation.

Figure 5:
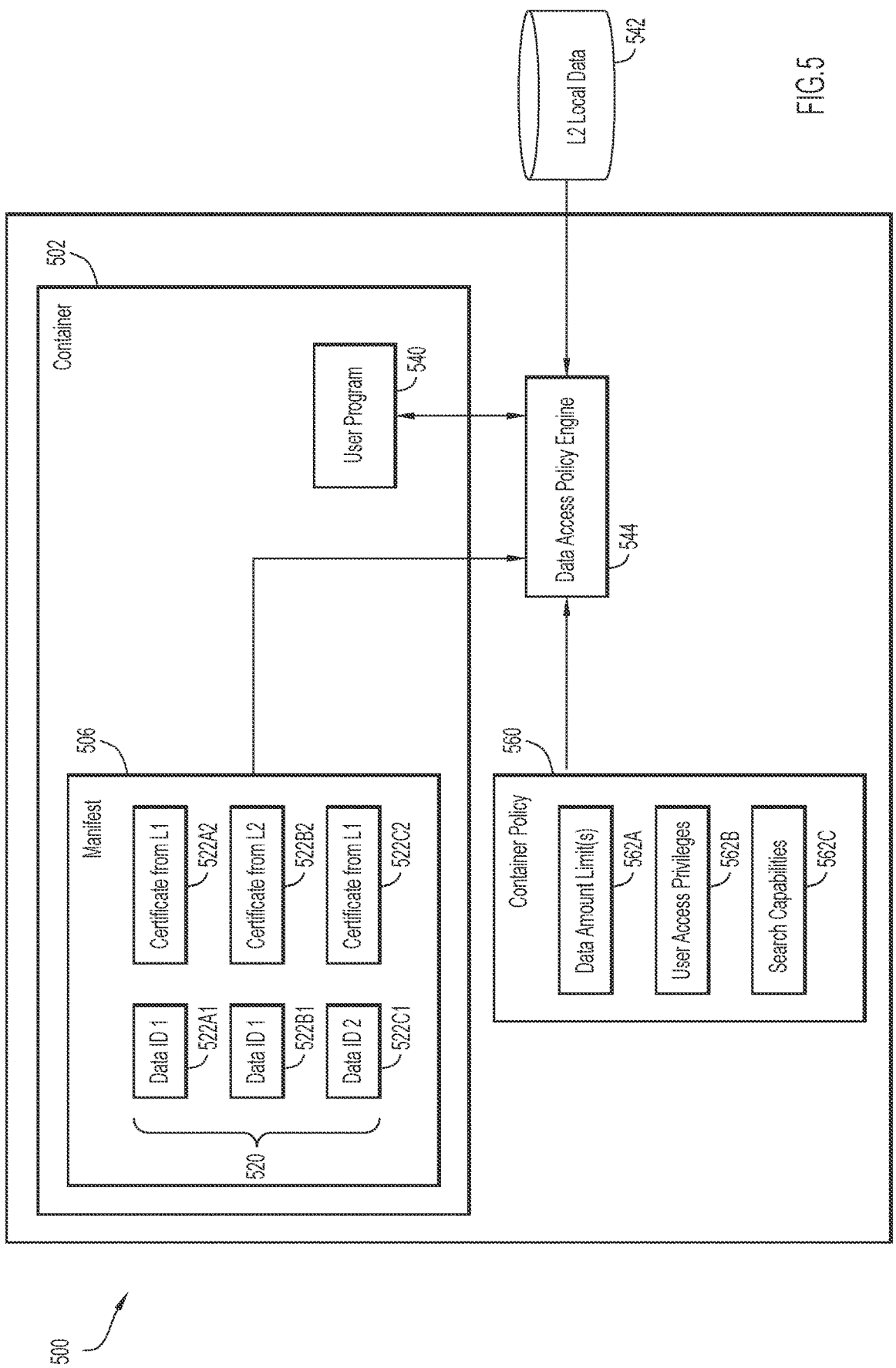
FIG. 5 is a block diagram of a container execution environment according to an example embodiment.

FIG. 5 is a block diagram of a container execution environment 500 according to an example embodiment. The container execution environment 500 is analogous to the container execution environment 108A or the container execution environment 108B discussed above with respect to FIG. 1. The container execution environment includes a container 502 that has been loaded for execution by the container execution environment 500. The container 502 is analogous to the container 106A-D of FIG. 1, container 200 of FIG. 2, container 302 of FIG. 3, or the container 402 of FIG. 4. The container 502 includes a manifest 506, analogous to the manifest 206 discussed above with respect to FIG. 2. The manifest 506 provides one or more indications of data the container 502 is authorized to access in one or more regulatory jurisdictions or locations. To that end, the manifest includes a plurality of data authorization records 520, represented as "rows" in FIG. 5. Each data authorization record identifies data accessible by the container via a data identifier, shown as data identifier 522A1, data identifier 522B1, and data identifier 522C1, and an associated authorization credential, shown as authorization credential 522A2, authorization credential 522B2, and authorization credential 522C2 respectively. In some embodiments, an authorization credential includes a digital certificate granted by a certificate authority of a particular jurisdiction. Thus, in the example of FIG. 5, the authorization credential 522B2 authorizes access to data identified by the data identifier 522B1 within a regulatory jurisdiction or location identified as "L2" in FIG. 5.

FIG. 5 also illustrates a user program 540, analogous to the user program 202 or the user program 408. The user program 540 requests access to local data 542 via a data access policy engine 544. The data access policy engine 544 is included as part of the container execution environment 500. When receiving a request for data from the user program 540, the data access policy engine consults the manifest 506 of the container 502 to determine if the user program 540 has been granted access to the requested data. For example, the user program 540 passes, in some embodiments, a data identifier of requested data to the data access policy engine 544. The data access policy engine 544 then searches the manifest 506 to determine if the data identifier is enumerated in the manifest 506, and whether there is an associated authorization credential authorizing the container 502 to access the identified data from the local jurisdiction (e.g. the jurisdiction in which the container execution environment 500 is operating). If an appropriate authorization credential is identified for the data identified via the data identifier, some embodiments determine that the user program 540 has access rights to access the local data being requested. Alternatively, if no authorization credential is identified from the manifest, the data access policy engine 544 denies or otherwise blocks access to the requested data.

Assuming the manifest includes the necessary authorization, the data access policy engine 544 provides the data from the local data 542 to the user program 540. The data access policy engine 544 also consults, in some embodiments, a container policy 560 when determining what data to provide to the user program 540. For example, the container policy 560 stores one or more of: data indicating one or more of a predefined data limit 562A on data obtained by the user program 540, user access privileges 562B of the local data 542 (e.g. which users can access which data stored in the local data 542), and search capabilities 562C of the container. In some embodiments, if data requested by the user program 540 conforms to requirements specified by the container policy 560, the data access policy engine 544 grants access to the requested data. Otherwise, the data access policy engine 544 blocks access to the requested data.

In other words, FIG. 5 depicts a process flow involving determining, based on routing information stored in the container, an identifier of data requested by the container; searching, a container execution environment table based on the identifier of data; identifying, based on the searching, the container execution environment has access to the data requested by the container; and routing the container to the container execution environment.

Figure 6:
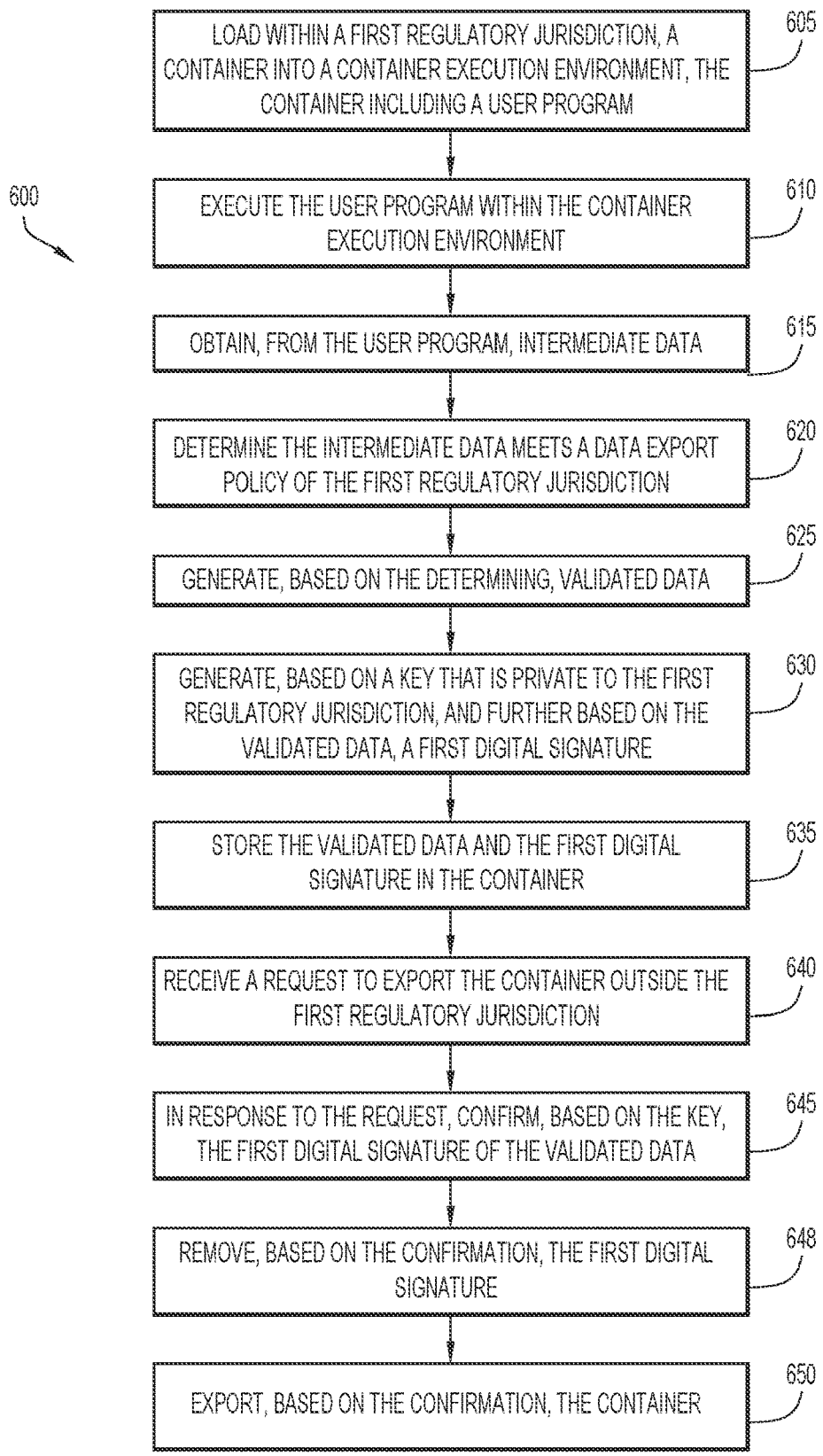
FIG. 6 is a flowchart of a method of executing a container in a container execution environment.

FIG. 6 is a flowchart of a method of executing a container in a container execution environment. In some embodiments, one or more of the functions discussed below are performed by a container execution environment, such as the container execution environment 108A or the container execution environment 108B discussed above with respect to FIG. 1.

In operation 605, a container is loaded into a container execution environment. The container includes a user program. User program in this context is generally defined as a group of instructions that configure a computing system to perform one or more functions attributed to the user program. There is no requirement that the user program be written, executed, or otherwise directed by a human or user. In some embodiments, the user program is largely autonomous, and executes unattended. In some embodiments, the user program includes intermediate code, such as byte codes in user programs implemented using the Java programming language, or common intermediate language (CIL) instructions, for example, in user programs implemented using the C #programming language. In some embodiments, the user program includes Python™ language statements.

Operation 610 executes the user program within the container execution environment. For example, executing the user program includes, in some embodiments, interpreting instructions included in the user program and performing functions indicated by the instructions. In some embodiments, executing the user program includes receiving one or more data access requests from the user program for local data. Some embodiments of method 600 intercept these data access requests and apply a data access policy to determine whether the container/user program is permitted to access the data being requested. As discussed above, the data access policy controls, in some embodiments, one or more of: which users are permitted to access which portions of local data, a limit on an amount of data a user program is able to access, or one or more search capabilities that are or are not available to the user program. Access to data requested by the executing user program is then either permitted or denied based on the data access policy, at least in some embodiments. Said another way, a process is performed that involves comparing an amount of data read by the container to a predefined data limit specified in a container policy, and allowing access to the data based on the comparing.

Data access attempted by the user program is also evaluated, in some embodiments, based on a manifest included in the container. As discussed above, in some embodiments, the manifest specifies particular types of data (e.g. data field names, such as first name, last name, date of birth, address, zip code, etc.) for which the user program/container has been granted permission to access. In some embodiments, the manifest is established prior to the container being imported into a jurisdiction or otherwise executed by the jurisdiction. In some embodiments, as discussed above, the manifest provides an identification of particular data within a jurisdiction and an authentication credential, such as a certificate issued by the regulatory jurisdiction providing said access. The authentication credential, if valid, indicates the container has access rights to access particular data identified by the data identification (e.g. data identifier 522A1) (at least in some embodiments). If the manifest indicates data access requested by the container is authorized, the access is allowed, otherwise, access to the requested data is blocked, at least in some embodiments.

In operation 615, intermediate data is obtained from the user program. As discussed above, some embodiments execute containers that process data local to a jurisdiction in which the user program is operating (e.g. the local data 109A or local data 109B). As a result of processing the local data (and potentially, other data stored in the container itself, such as data generated in another jurisdiction (e.g. the first blob 410)), or other data local to the container (e.g. container local data 404), the user program generates intermediate data, such as intermediate data 418 of FIG. 4.

In operation 620, a determination is made that the intermediate data meets a data export policy of the first regulatory jurisdiction. For example, as discussed above with respect to FIG. 4, after the intermediate data (e.g., intermediate data 418) is generated by the user program (e.g. user program 408), a validation of the intermediate data is performed, based on policy information (e.g. policy information 424). The validation confirms that any intermediate data generated by the user program does not include data that is unavailable for export outside the regulatory jurisdiction. Such data includes, in some embodiments, personally identifiable information (PII), such as names, addresses, social security numbers, passport numbers, date of birth, or other PII type information. Certain regulatory environments have additional restrictions. For example, in some jurisdictions, data that can be used to track an individual's activities on-line, or their physical location over a period of time, cannot be exported from the jurisdiction.

As discussed above with respect to FIG. 4, some embodiments of operation 620 also confirm that the intermediate data complies with indications included in a manifest (e.g. manifest 430) included in the container. Some embodiments of operation 620 also confirm that the intermediate data complies with jurisdictional specific policy information, such as discussed above with respect to FIG. 4 and policy information 424.

Operation 625 generates validated data based on the determination of operation 620. In some embodiments, generating validated data includes indicating, via a flag, bit or other stored information that the intermediate data has been successfully completed the validation process. The validated data then includes, in at least some embodiments, the intermediate data and in some embodiments, the indication that the intermediate data has been validated.

In operation 630, a digital signature of the validated data is generated. As discussed above, in at least some embodiments, each regulatory jurisdiction maintains a set of one or more private keys that are used to digitally sign data that the jurisdiction (e.g. a validation service of the jurisdiction, or an ingress processing service of the jurisdiction) has confirmed is approved for export outside of the jurisdiction. Thus, since the intermediate data has been validated in operation 620, the validated data is digitally signed to indicate the regulatory jurisdiction has confirmed that the intermediate data can be exported.

Some embodiments of operation 630 include encrypting the validated data before it is digitally signed. As discussed above, some embodiments implement a local service chain that includes an encryption component, and thus off-loads a need for the container to provide its own encryption capabilities. Eliminating encryption capabilities from the component itself provides some level of assurance that data accessed within a jurisdiction is not encrypted by the container such that the data might escape scrutiny by the service chain's validation component. So that the container is able to have the encrypted data decrypted, at least some service chains encrypt the intermediate data using a key that is then stored in the container for later decryption. Thus, for example, if the container moves to a different jurisdiction but requires access to the intermediate data, the intermediate data can be decrypted in the different jurisdiction by retrieving the key from the container, and then decrypting via the service chain implemented in the different jurisdiction. In embodiments that encrypt the intermediate data, the data is encrypted and then digitally signed in operation 630.

In operation 635, the validated data and the first digital signature are stored in the container. The first digital signature provides a record that the validated data has been approved for export outside the first regulatory jurisdiction. If the container is provided to an egress component (e.g., as discussed further below), the egress component is able to verify whether any data included in the container is approved for export based on a digital signature associated with the data (e.g. as the first digital signature is associated with the validated data).

In operation 640, a request is received to export the container outside the first regulatory jurisdiction. In some embodiments, the request is received by a virtual custom/egress processing component (e.g. the virtual custom 114A).

In response to the request, operation 645 confirms the first digital signature of the validated data. For example, a new digital signature of the validated data is computed, in some embodiments of operation 645, and then compared to the first digital signature stored in the container in operation 635. If the two digital signatures match, then the first digital signature is confirmed (e.g., indicating that the validated data in the container has not been modified since its validation).

In operation 648, the first digital signature is removed from a blob storing the validated data. In some embodiments of method 600, once operation 645 has confirmed that the validated data includes a valid digital signature, and therefore has been successfully validated and thus approved for export from a jurisdiction, the digital signature indicating this is removed, such that this data is not maintained outside of the regulatory jurisdiction, where it will generally no longer be necessary.

In operation 650, the container is exported outside the jurisdiction based on the confirmation of the first digital signature in operation 645. For example, in some embodiments, exporting the container outside the jurisdiction includes transferring the container data from an egress component (e.g. virtual custom 114A of FIG. 1) of the first jurisdiction to an ingress component of a second jurisdiction (e.g. the second virtual custom 114B of FIG. 1). Exporting the container also includes, in some embodiments, deleting the container or any copies of the container remaining in the first regulatory jurisdiction.

Some embodiments of method 600 include importing the container into the first regulatory jurisdiction. For example, in some embodiments, an ingress processing component (e.g. virtual custom 114A) receives the container from another jurisdiction. The ingress processing component then digitally signs any data included in the container at the time of importation, and adds the digital signature to the data (e.g. analogous to the L2 ingress signature 412 discussed above with respect to FIG. 4). Thus, the new digital signature, created during the importation, is stored in the container. When the container is exported from the first jurisdiction, this new digital signature is verified against the imported data to confirm that the imported data has not been modified since importation, and can thus be exported.

In some embodiments, after importation, routing information included in the container is evaluated to identify a container execution environment with access to data requested by the container. For example, as discussed above with respect to FIG. 3, some container embodiments store routing information indicating data requested by the container (e.g. via the data identifier 308B). The routing information also indicates, in some embodiments, a jurisdiction from which the data is requested (e.g., via location identifier 308A). Thus, in some embodiments, an ingress processing component scans the routing information in the container for data requested that is available in the first regulatory jurisdiction. The ingress component then searches, in some embodiments, a data store analogous to the container execution environment table 322 to identify which container execution environment maintained by the first regulatory jurisdiction provides access to the data specified in the routing table. The container is then routed to the appropriate container execution environment for execution.

Figure 7:
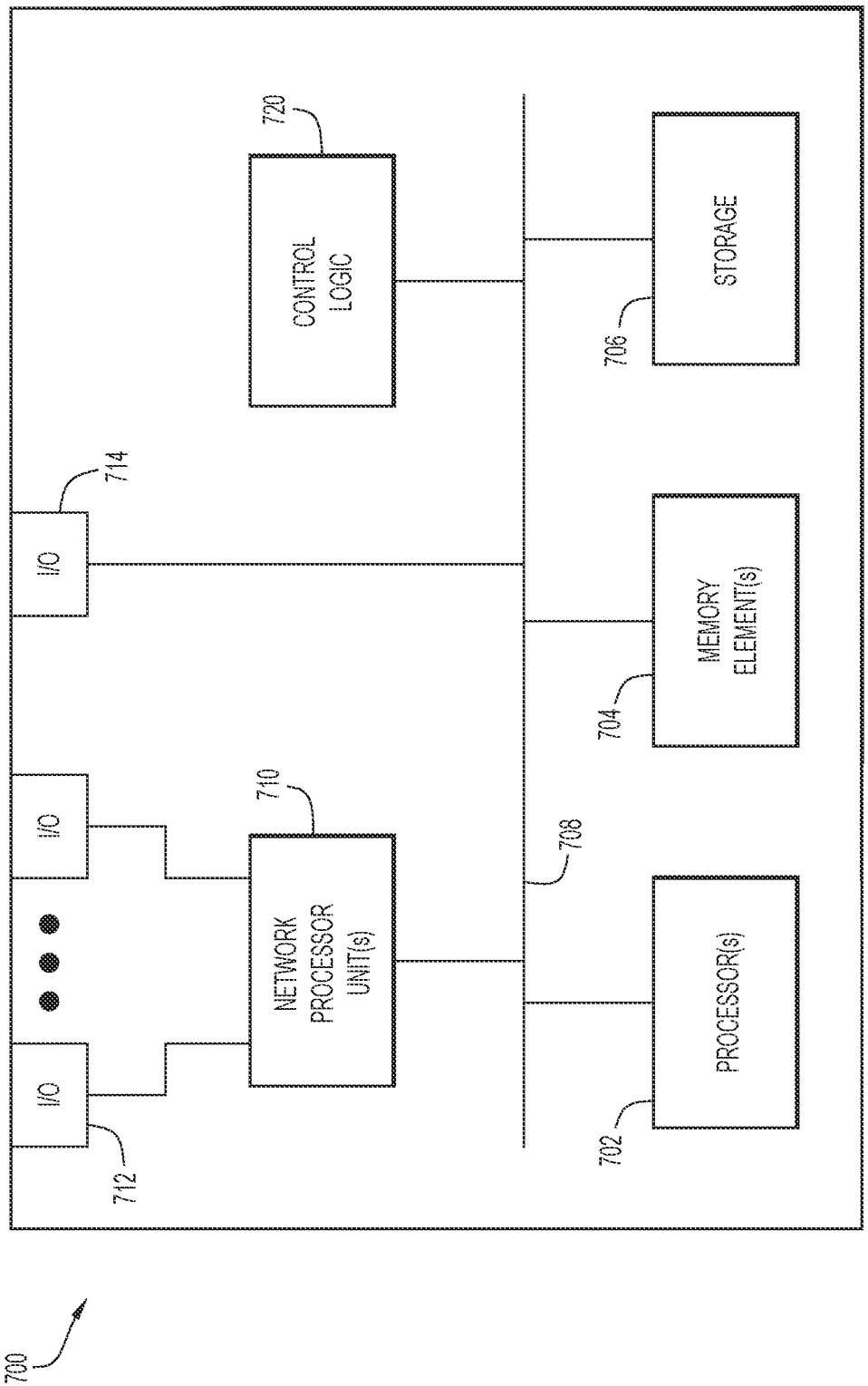
FIG. 7 is a hardware block diagram of a device 700 that may perform functions associated with operations discussed herein in connection with the techniques depicted in any one or more of FIGS. 1-6.

FIG. 7 is a hardware block diagram of a device 700 that may perform functions associated with operations discussed herein in connection with the techniques depicted in any one or more of FIGS. 1-6. In various embodiments, any of the devices described above (e.g., a container execution environment, local service chain, ingress component, egress component, etc.) implement, in some embodiments, a computing architecture analogous to that described below with respect to the device 700.

In at least one embodiment, the device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for device 700 can overlap in any manner and are not limited to the specific allocation of instructions and/or operations described herein.

In at least one embodiment, processor(s) 702 is/are at least one hardware processor configured to execute various tasks, operations and/or functions for device 700 as described herein according to software and/or instructions configured for device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with device 700, and/or logic configured for memory element(s) 704 and/or storage 706. For example, any logic described herein (e.g., control logic 720) can, in various embodiments, be stored for device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of device 700 to communicate in order to exchange information and/or data. Bus 708 can be implemented with any architecture designed for passing control, data and/or information between processors, memory elements/storage, peripheral devices, and/or any other hardware and/or software components that may be configured for device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between device 700 and other systems, devices, or entities, via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 700 and other systems, devices, or entities to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to device 700. For example, I/O interface(s) 714 may provide a connection to external devices such as a display, keyboard, keypad, a touch screen, a camera, a microphone, and/or any other suitable input and/or output device now known or hereafter developed. This may be the case, in particular, when the device 700 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 700 serves as a user device as described herein.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/fifth generation (5G)/next generation (nG), an IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as but not limited to electric, sound, light, infrared, qubits, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that includes loading, within a first regulatory jurisdiction, a container into a container execution environment, the container including a user program, executing the user program within the container execution environment, obtaining from the user program, intermediate data, determining the intermediate data meets a data export policy of the first regulatory jurisdiction, generating, based on the determining, validated data, generating, based on a key that is private to the first regulatory jurisdiction, and further based on the validated data, a first digital signature, storing the validated data and the first digital signature in the container, receiving a request to export the container outside the first regulatory jurisdiction, in response to the request, confirming, based on the key, the first digital signature of the validated data included in the container; and exporting, based on the confirming, the container.

In another form, an apparatus is provided that comprises a network interface configured to enable network communications, one or more processors, and one or more memories storing instructions that when executed configure the one or more processors to perform operations comprising loading, within a first regulatory jurisdiction, a container into a container execution environment, the container including a user program, executing the user program within the container execution environment, obtaining from the user program, intermediate data, determining the intermediate data meets a data export policy of the first regulatory jurisdiction, generating, based on the determining, validated data, generating, based on a key that is private to the first regulatory jurisdiction, and further based on the validated data, a first digital signature, storing the validated data and the first digital signature in the container, receiving a request to export the container outside the first regulatory jurisdiction, in response to the request, confirming, based on the key, the first digital signature of the validated data included in the container; and exporting, based on the confirming, the container.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    loading, within a first regulatory jurisdiction, a container into a container execution environment, the container including a user program;
    executing the user program within the container execution environment;
    obtaining from the user program, intermediate data;
    determining the intermediate data meets a data export policy of the first regulatory jurisdiction;
    generating, based on the determining, a validated data;
    generating, based on a first key that is private to the first regulatory jurisdiction, and further based on the validated data, a first digital signature;
    storing the validated data and the first digital signature in the container;
    receiving a request to export the container outside the first regulatory jurisdiction;
    in response to the request, confirming, based on the first key, the first digital signature of the validated data included in the container; and
    exporting, based on the confirming, the container.

2. The method of claim 1, further comprising encrypting the validated data before digitally signing the validated data, the encrypting based on a second key stored in the container.

3. The method of claim 2, further comprising:
    importing the container into the first regulatory jurisdiction;
    in response to the importing, generating, based on the first key and further based on imported data included in the container, a second digital signature; and
    storing the second digital signature of the imported data in the container.

4. The method of claim 1, further comprising:
    determining, based on routing information stored in the container, an identifier of data requested by the container;
    searching, a container execution environment table based on the identifier of data;
    identifying, based on the searching, the container execution environment has access to the data requested by the container; and
    routing the container to the container execution environment.

5. The method of claim 1, further comprising:
    receiving, from the container, a request to access data local to the first regulatory jurisdiction;
    determining, based on a manifest stored in the container, whether the container has access rights to access the data local to the first regulatory jurisdiction; and
    allowing access to the data based on the determining.

6. The method of claim 5, wherein the determining comprises determining whether the manifest includes a certificate authorizing the access to the data by the container.

7. The method of claim 5, wherein the determining comprises comparing an amount of data read by the container to a predefined data limit specified in a container policy, and allowing access to the data based on the comparing.

8. The method of claim 1, wherein the exporting comprises transferring the container to a second regulatory jurisdiction.

9. An apparatus comprising:
    a network interface configured to enable network communications; and
    one or more processors; and one or more memories storing instructions that when executed configure the one or more processors to perform operations comprising:
        loading, within a first regulatory jurisdiction, a container into a container execution environment, the container including a user program;
        executing the user program within the container execution environment;
        obtaining from the user program, intermediate data;
        determining the intermediate data meets a data export policy of the first regulatory jurisdiction;
        generating, based on the determining, a validated data;
        generating, based on a first key that is private to the first regulatory jurisdiction, and further based on the validated data, a first digital signature;
        storing the validated data and the first digital signature in the container;
        receiving a request to export the container outside the first regulatory jurisdiction;
        in response to the request, confirming, based on the first key, the first digital signature of the validated data included in the container; and
        exporting, based on the confirming, the container.

10. The apparatus of claim 9, the operations further comprising encrypting the validated data before digitally signing the validated data, the encrypting based on a second key stored in the container.

11. The apparatus of claim 9, the operations further comprising:
    importing the container into the first regulatory jurisdiction;
    in response to the importing, generating, based on the first key and further based on imported data included in the container, a second digital signature; and
    storing the second digital signature of the imported data in the container.

12. The apparatus of claim 9, the operations further comprising:
    determining, based on routing information stored in the container, an identifier of data requested by the container;
    searching, a container execution environment table based on the identifier of data;

identifying, based on the searching, the container execution environment has access to the data requested by the container; and routing the container to the container execution environment.

13. The apparatus of claim 9, the operations further comprising:

receiving, from the container, a request to access data local to the first regulatory jurisdiction;

determining, based on a manifest stored in the container, whether the container has access rights to access the data local to the first regulatory jurisdiction; and allowing access to the data based on the determining.

14. The apparatus of claim 13, wherein the determining comprises determining whether the manifest includes a certificate authorizing the access to the data requested by the container.

15. The apparatus of claim 13, wherein the determining comprises comparing an amount of data read by the container to a predefined data limit specified in a container policy, and allowing access to the data based on the comparing.

16. The apparatus of claim 9, wherein the exporting comprises transferring the container to a second regulatory jurisdiction.

17. A non-transitory computer readable storage medium comprising instructions that when executed configure one or more processors to perform operations comprising:

loading, within a first regulatory jurisdiction, a container into a container execution environment, the container including a user program;

executing the user program within the container execution environment;

obtaining from the user program, intermediate data;

determining the intermediate data meets a data export policy of the first regulatory jurisdiction;

generating, based on the determining, a validated data;

generating, based on a first key that is private to the first regulatory jurisdiction, and further based on the validated data, a first digital signature;

storing the validated data and the first digital signature in the container;

receiving a request to export the container outside the first regulatory jurisdiction;

in response to the request, confirming, based on the first key, the first digital signature of the validated data included in the container; and exporting, based on the confirming, the container.

18. The non-transitory computer readable storage medium of claim 17, the operations further comprising encrypting the validated data before digitally signing the validated data, the encrypting based on a second key stored in the container.

19. The non-transitory computer readable storage medium of claim 18, the operations further comprising:

importing the container into the first regulatory jurisdiction;

in response to the importing, generating, based on the first key and further based on imported data included in the container, a second digital signature; and storing the second digital signature of the imported data in the container.

20. The non-transitory computer readable storage medium of claim 17, the operations further comprising:

receiving, from the container, a request to access data local to the first regulatory jurisdiction;

determining, based on a manifest stored in the container, whether the container has access rights to access the data local to the first regulatory jurisdiction; and allowing access to the data based on the determining.

* * * * *